(12) United States Patent
Hara et al.

(10) Patent No.: US 12,735,095 B2
(45) Date of Patent: Sep. 15, 2026

(54) STRADDLED VEHICLE WITH A HANDLEBAR AND ELECTRIC STEERING DEVICE

(71) Applicant: YAMAHA HATSUDOKI KABUSHIKI KAISHA, Iwata (JP)

(72) Inventors: Nobuo Hara, Shizuoka (JP); Hidekazu Tsuboi, Shizuoka (JP); Yasunobu Harazono, Shizuoka (JP); Naoya Fujii, Shizuoka (JP); Daiki Ohara, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 548 days.

(21) Appl. No.: 18/333,907

(22) Filed: Jun. 13, 2023

(65) Prior Publication Data

US 2023/0347971 A1 Nov. 2, 2023

Related U.S. Application Data

(63) Continuation-in-part of application No. PCT/JP2021/046605, filed on Dec. 16, 2021.

(30) Foreign Application Priority Data

Dec. 18, 2020 (WO) .................. PCT/JP2020/047450

(51) Int. Cl.
*B62D 6/00* (2006.01)
*B62D 5/04* (2006.01)
(Continued)

(52) U.S. Cl.
CPC ............... *B62D 6/00* (2013.01); *B62D 5/046* (2013.01); *B62K 21/00* (2013.01); *B62J 45/411* (2020.02);
(Continued)

(58) Field of Classification Search
CPC .......... B62D 6/00; B62D 5/046; B62K 21/00; B62K 21/08; B62J 45/411; B62J 45/4151; B62J 45/413
See application file for complete search history.

(56) References Cited

U.S. PATENT DOCUMENTS

| | | | | |
|---|---|---|---|---|
| 6,448,728 | B2 * | 9/2002 | Noro .................... | B62D 5/0484 180/443 |
| 6,816,765 | B2 * | 11/2004 | Yamamoto ........... | B62D 5/0457 180/407 |

(Continued)

FOREIGN PATENT DOCUMENTS

| | | |
|---|---|---|
| JP | 2003312503 A | 11/2003 |
| JP | 2006232243 A | 9/2006 |

(Continued)

OTHER PUBLICATIONS

Office Action issued in the the corresponding Brazilian patent application BR112023011686-4 dated Jul. 9, 2025.

(Continued)

*Primary Examiner* — Timothy Wilhelm
(74) *Attorney, Agent, or Firm* — Rabin & Berdo, P.C.

(57) ABSTRACT

A straddled vehicle, including a vehicle body having a rotatable handlebar; a steerable wheel, operation of which is transmitted mechanically to steer the steerable wheel; an actuator configured to apply a steering assisting force to the steerable wheel in accordance with the operation of the handlebar; and a control device configured to control the actuator by outputting a first physical quantity related to the steering assisting force, in accordance with a second physical quantity related to the operation of the handlebar. The control device performs, in response to an external instruction or fulfillment of a condition, setting or changing a dead band, which is a predetermined range of the second physical quantity in which the first physical quantity is not outputted
(Continued)

even with the operation of the handlebar, and/or setting or changing an output increasing range in which as the second physical quantity increases, the outputted first physical quantity increases.

13 Claims, 4 Drawing Sheets

(51) Int. Cl.

| | |
|---|---|
| ***B62J 45/411*** | (2020.01) |
| ***B62J 45/413*** | (2020.01) |
| ***B62J 45/415*** | (2020.01) |
| ***B62K 21/00*** | (2006.01) |
| ***B62K 21/08*** | (2006.01) |

(52) U.S. Cl.

CPC .......... *B62J 45/413* (2020.02); *B62J 45/4151* (2020.02); *B62K 21/08* (2013.01)

(56) References Cited

U.S. PATENT DOCUMENTS 9,050,996 B2 * 6/2015 Kitazume .............. B62D 5/046
10,597,072 B2 * 3/2020 Tsubaki ............... B62D 15/025
2004/0064228 A1 * 4/2004 Yamamoto ........... B62D 5/0463 180/443
2006/0191739 A1 * 8/2006 Koga ..................... B62K 21/00 180/446
2015/0057889 A1 * 2/2015 Tamaizumi .......... B62D 5/0463 701/41
2019/0084639 A1 3/2019 Toyota et al.
2023/0347971 A1 11/2023 Hara et al.

FOREIGN PATENT DOCUMENTS

JP 2012076511 A 4/2012
JP 2017206169 A 11/2017
JP 2017206170 A 11/2017
JP 7603715 B2 12/2024
WO 2019087578 A1 5/2019

OTHER PUBLICATIONS

Office Action issued for corresponding Thai patent application No. 2301003275, and its English translation, dated May 26, 2026.

* cited by examiner

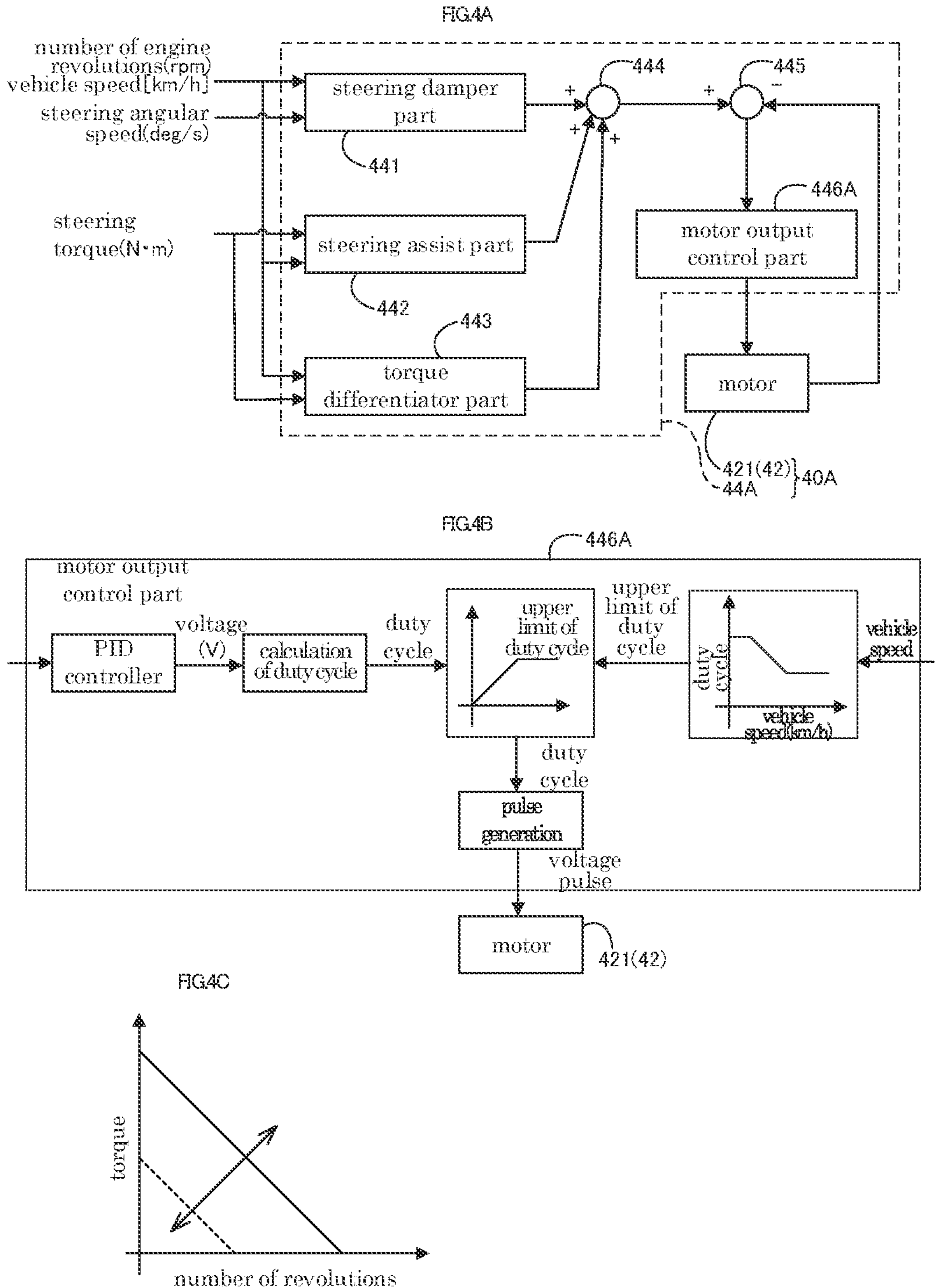
FIG.4A
number of engine revolutions(rpm)
vehicle speed[km/h]
steering angular speed(deg/s)
steering torque(N·m)
steering damper part
steering assist part
torque differentiator part
motor output control part
motor
441
442
443
444
445
446A
421(42)
44A
40A
FIG.4B
446A
motor output control part
PID controller
voltage (V)
calculation of duty cycle
duty cycle
upper limit of duty cycle
upper limit of duty cycle
duty cycle
vehicle speed(km/h)
vehicle speed
duty cycle
pulse generation
voltage pulse
motor
421(42)
FIG.4C
torque
number of revolutions

STRADDLED VEHICLE WITH A HANDLEBAR AND ELECTRIC STEERING DEVICE

TECHNICAL FIELD

The present teaching relates to a straddled vehicle with a handlebar and an electric steering device to be used in the straddled vehicle with a handlebar.

BACKGROUND ART

Conventionally, straddled vehicles with a handlebar are known. In recent years, as such a straddled vehicle with a handlebar, for example, as disclosed in International Publication WO 2019/87578, a straddled vehicle that is configured to have a function to apply a steering assisting force according to operation of the handlebar conducted by the rider of the straddled vehicle to a steerable wheel, i.e., configured to have a steering assistance function has been suggested.

CITATION LIST

Patent Literature

Patent Literature 1: International Publication WO 2019/87578

SUMMARY OF INVENTION

Technical Problem

An objective of the present teaching is to provide a straddled vehicle with a handlebar that is configured to have an improved steering assistance function for convenience.

Solution to Problem

A straddled vehicle with a handlebar according to an embodiment of the present teaching includes a vehicle body, a steerable wheel, an actuator, and a control device. The vehicle body has the handlebar. The vehicle body supports the handlebar such that the handlebar is rotatable and that the maximum operation angle of the handlebar from a handle neutral position, which is a handle position when the straddled vehicle is moving straight ahead, is less than 180 degrees. The steerable wheel is supported by the vehicle body. Operation of the handlebar conducted by the rider of the straddled vehicle is transmitted to the steerable wheel mechanically, and thereby, the steerable wheel is steered according to the operation. The actuator is configured to apply a steering assisting force to the steerable wheel in accordance with operation of the handlebar conducted by the rider of the straddled vehicle. The control device carries out actuator control processing to control the actuator by outputting a steering-assisting-force-related physical quantity, which is a physical quantity related to steering assisting force, in accordance with a handlebar-operation-related physical quantity, which is a physical quantity related to operation of the handlebar. The control device is configured to change a relationship between the handlebar-operation-related physical quantity and the steering-assisting-force-related physical quantity by performing at least one of (1) or (2) below, in response to an instruction inputted from outside of the straddled vehicle or fulfillment of a condition that restrains behaviors of the actuator, such that the outputted steering-assisting-force-related physical quantity varies even when the handlebar-operation-related physical quantity is the same:

(1) changing a predetermined range of the handlebar-operation-related physical quantity in which the steering-assisting-force-related physical quantity is not outputted even with operation of the handlebar, thereby varying the outputted steering-assisting-force-related physical quantity even when the handlebar-operation-related physical quantity is the same; and (2) changing the relationship between the handlebar-operation-related physical quantity and the steering-assisting-force-related physical quantity outputted in accordance with the handlebar-operation-related physical quantity in an output increasing range in which as the handlebar-operation-related physical quantity is increasing, the steering-assisting-force-related physical quantity outputted in accordance with the handlebar-operation-related physical quantity increases, thereby varying the outputted steering-assisting-force-related physical quantity even when the handlebar-operation-related physical quantity is the same.

This straddled vehicle with a handlebar has an improved steering assistance function for convenience. Details will be described below.

Regarding a straddled vehicle with a handlebar, the operation angle of the handlebar when the straddled vehicle is in motion is small. Accordingly, sensitivity of driving conditions is easily influenced by the steering of the rider. Regarding the above-described straddled vehicle with a handlebar, even when the rider conducts the same operation of the handlebar, the steering assisting force in response to the operation can be variable. In other words, the setting for the steering assistance function can be variable. As a result, the convenience of the steering assistance function can be improved.

According to the embodiment of the present teaching, for example, the straddled vehicle is a vehicle with a saddle-type seat. The straddled vehicle is a vehicle on which a rider sits like straddling a saddle. The straddled vehicle, for example, includes at least one front wheel and at least one rear wheel. In other words, the straddled vehicle is not limited to a two-wheeled vehicle, and the straddled vehicle may be a three-wheeled vehicle having a pair of left and right front wheels or a pair of left and right rear wheels, or a four-wheeled vehicle having a left-right pair of front wheels and a left-right pair of rear wheels. The straddled vehicle, for example, may be a leaning vehicle. The leaning vehicle is a vehicle having a vehicle body that leans leftward when the vehicle turns left and leans rightward when the vehicle turns right. The straddled vehicle may have a drive source. The drive source may be an engine, an electric motor, or a combination of an engine and an electric motor.

According to the embodiment of the present teaching, for example, the handlebar may be a single handlebar extending continuously in the left-right direction of the straddled vehicle or may include a left handlebar and a right handlebar that are respectively positioned on the left and right of the straddled vehicle separately from each other.

According to the embodiment of the present teaching, for example, the vehicle body includes a vehicle body frame. The vehicle body frame may be a frame constructed by assembling a plurality of parts or a frame formed by integrally molding a plurality of parts. The material of the vehicle body frame may be metal, such as aluminum, iron or the like, synthetic resin, such as CFRP or the like, or a combination of such metal and synthetic resin. The vehicle body frame may be a monocoque structure that is structured by exterior parts of the straddled vehicle or a semi-monocoque structure of which some part serves also as exterior parts of the straddled vehicle.

According to the embodiment of the present teaching, for example, the steerable wheel is supported by the vehicle body such that the steerable wheel is rotatable around an axis extending in an up-down direction of the vehicle body. The axis extending in an up-down direction of the vehicle body needs not extend in the vertical direction when the vehicle body is upright. The axis extending in an up-down direction of the vehicle body may be inclined from the vertical direction toward the rear of the vehicle body when the vehicle body is upright. In other words, when the vehicle body is upright, the upper end of the axis extending in an up-down direction of the vehicle body may be positioned more rearward than the lower end of the axis extending in an up-down direction of the vehicle body. The steerable wheel, for example, may be supported by the vehicle body directly or supported by the vehicle body indirectly. The way in which the steerable wheel is supported by the vehicle body indirectly, for example, includes using a suspension that is positioned between the steerable wheel and the vehicle body to support the steerable wheel on the vehicle body. The steerable wheel may be a front wheel or a rear wheel. There may be one steerable wheel or two steerable wheels. The suspension that supports one steerable wheel is, for example, a telescopic type or bottom link type front fork. The suspension that supports two steerable wheels is, for example, an independent suspension. The two steerable wheels, for example, are arranged in a left-right direction of the straddled vehicle. The way in which operation of the handlebar conducted by the rider is transmitted to the steerable wheel(s) mechanically, for example, includes positioning an actuator on the transmission route of force from the handlebar to the steerable wheel(s), causing the actuator to output a steering assisting force in response to operation of the handlebar conducted by the rider, and transmitting the steering assisting force to the steerable wheel(s). The actuator is positioned on the transmission route of force from the handlebar to the steerable wheel(s) so that operation of the handlebar conducted by the rider can be transmitted to the steerable wheel(s) even when the actuator is inactive. For example, the actuator is positioned on the transmission route of force from the handlebar to the steerable wheel(s) and has a function to increase the force transmitted from the handlebar to the steerable wheel(s).

According to the embodiment of the present teaching, the actuator only needs to output a steering assisting force to the steerable wheel(s) and is not particularly limited. For example, the actuator is a reversibly rotatable electric motor. The actuator applies a steering assisting force to the steerable wheel(s), for example, based on a signal sent from a sensor that detects operation of the handlebar conducted by the rider. The sensor that detects operation of the handlebar conducted by the rider is, for example, a torque sensor that detects torque generated by operation of the handlebar conducted by the rider. The steering assisting force, for example, may be a force that assists the steerable wheel(s) to be steered in the direction in which the rider operates the handlebar. In other words, the steering assisting force may be a force that facilitates steering of the steerable wheel(s) in the direction in which the rider operates the handlebar. The steering assisting force, for example, may be a force that suppresses the steerable wheel(s) from being steered in the direction in which the rider operates the handlebar. In other words, the steering assisting force may be a force that makes it difficult for the steerable wheel(s) to be steered in the direction in which the rider operates the handlebar.

According to the embodiment of the present teaching, for example, the control device is an ECU (electric control unit). For example, the ECU is realized by a combination of an IC (integrated circuit), an electronic component, a circuit board, etc. The control device performs control, for example, by allowing a CPU (central processing unit) to read a program stored in a non-volatile memory and then performing predetermined processing following the program, and the like.

According to the embodiment of the present teaching, for example, the handlebar-operation-related physical quantity is a physical quantity generated from operation of the handlebar conducted by the rider. The handlebar-operation-related physical quantity may be, for example, an operation angular speed that shows a change in operation angle per unit time when the handlebar is operated, a steering torque inputted by operation of the handlebar, a frequency of steering torque, or a differential value of steering torque. When the straddled vehicle is in motion at a high speed, the steering torque and the roll angular speed are substantially proportional to each other, and therefore, the roll angular speed may be used instead of the steering torque. The roll angular speed shows a change in the lean angle of the vehicle body of the straddled vehicle with a handlebar per unit time. When the straddled vehicle is in motion at a high speed means, for example, when the straddled vehicle is in motion at a speed of 80 km/h or higher.

According to the embodiment of the present teaching, for example, the steering-assisting-force-related physical quantity is a physical quantity used for output of the steering assisting force. The steering-assisting-force-related physical quantity is, for example, an electric current supplied to the actuator. The way of outputting an electric current, for example, includes outputting a drive signal corresponding to the electric current. To change the relationship between the handlebar-operation-related physical quantity and the steering-assisting-force-related physical quantity, for example, the relationship between the handlebar-operation-related physical quantity and a current instruction value that specifies the electric current serving as the steering-assisting-force-related physical quantity may be changed. The above-described handlebar-operation-related physical quantity is a physical quantity inputted to the control device, whereas the steering-assisting-force-related physical quantity is a physical quantity generated or outputted by the control device, and thus, these physical quantities are different from each other.

According to the embodiment of the present teaching, the "instruction inputted from outside of the straddled vehicle", for example, includes "an instruction inputted by the rider of the straddled vehicle". Accordingly, the control device may change the relationship between the handlebar-operation-related physical quantity and the steering-assisting-force-related physical quantity by performing at least one of (1) or (2) below in response to an instruction inputted by the rider of the straddled vehicle such that the outputted steering-assisting-force-related physical quantity varies even when the handlebar-operation-related physical quantity is the same. The way in which the rider inputs an instruction, for example, includes the rider inputting an instruction by operating an operation means provided in the straddled vehicle and the rider inputting an instruction by operating a terminal device that can communicate with the straddled vehicle. The condition that restrains behaviors of the actuator may be, for example, a condition that relates to the state of the actuator itself, or a condition that relates to the state of the electric power source in the case where the actuator is actuated by electric power supplied from an electric power source provided in the straddled vehicle. The condition that relates to the state of the actuator itself may be, for example, whether or not the temperature of the part of the actuator that is heated when the actuator is active is higher than a reference temperature. The condition that relates to the state of the electric power source may be, for example, whether or not the voltage applied to the control device is lower than a reference voltage.

According to the embodiment of the present teaching, the "predetermined range of the handlebar-operation-related physical quantity in which the steering-assisting-force-related physical quantity is not outputted even with operation of the handlebar" is, for example, a range of the handlebar-operation-related physical quantity in which any steering assisting force is not applied to the steerable wheel even with operation of the handlebar. The way of changing the "predetermined range of the handlebar-operation-related physical quantity in which the steering-assisting-force-related physical quantity is not outputted even with operation of the handlebar" may be, for example, changing the width of the range, that is, widening the range, narrowing the range, or alternatively shifting the range without changing the width. For example, when the handlebar-operation-related physical quantity is the frequency of steering torque, it is possible to change the frequency range of steering torque, in which the steering-assisting-force-related physical quantity is not outputted even with operation of the handlebar, by changing the cut-off frequency of a filter. In order to change the "predetermined range of the handlebar-operation-related physical quantity in which the steering-assisting-force-related physical quantity is not outputted even with operation of the handlebar", for example, the handlebar-operation-related physical quantity at which the steering-assisting-force-related physical quantity begins to be outputted in response to operation of the handlebar may be changed. This makes it easy for the rider to realize the effect of the change in the setting for the steering assistance function. Also, in order to change the "predetermined range of the handlebar-operation-related physical quantity in which the steering-assisting-force-related physical quantity is not outputted even with operation of the handlebar", for example, in addition to the above-described change, the handlebar-operation-related physical quantity at which half of the maximum value of the steering-assisting-force-related physical quantity is outputted in response to operation of the handlebar may be changed.

According to the embodiment of the present teaching, the "output increasing range in which as the handlebar-operation-related physical quantity is increasing, the steering-assisting-force-related physical quantity outputted in accordance with the handlebar-operation-related physical quantity increases" can be set to the whole or part of the range of values on which the handlebar-operation-related physical quantity can take. With the handlebar-operation-related physical quantity being within the output increasing range, as the handlebar-operation-related physical quantity is increasing, the outputted steering-assisting-force-related physical quantity increases. The output increasing range exists, for example, both before and after a change in the relationship between the handlebar-operation-related physical quantity and the steering-assisting-force-related physical quantity. In the range of values on which the handlebar-operation-related physical quantity can take, the range of the handlebar-operation-related physical quantity corresponding to the output increasing range may become different or may stay the same before and after the change in the relationship. When the range of the handlebar-operation-related physical quantity corresponding to the output increasing range after the change is wider than the range before the change, in order to output the same magnitude of the steering-assisting-force-related physical quantity as before the change, a greater magnitude of the handlebar-operation-related physical quantity than before the change is needed. The range of the steering-assisting-force-related physical quantity in the output increasing range, that is, the range of values on which the steering-assisting-force-related physical quantity can take in the output increasing range may stay the same or become different before and after the change in the relationship between the handlebar-operation-related physical quantity and the steering-assisting-force-related physical quantity. The way of changing the relationship between the handlebar-operation-related physical quantity and the steering-assisting-force-related physical quantity in the output increasing range, for example, includes "changing the relationship between the handlebar-operation-related physical quantity and the steering-assisting-force-related physical quantity without changing the handlebar-operation-related physical quantity corresponding to the start of the output increasing range". The handlebar-operation-related physical quantity corresponding to the start of the output increasing range is, for example, the handlebar-operation-related physical quantity at which the steering-assisting-force-related physical quantity begins to be outputted in response to operation of the handlebar. The way of "changing the relationship between the handlebar-operation-related physical quantity and the steering-assisting-force-related physical quantity without changing the handlebar-operation-related physical quantity corresponding to the start of the output increasing range", for example, includes multiplying the steering-assisting-force-related physical quantity associated with the handlebar-operation-related physical quantity inputted to the control device with a suitable coefficient. The way of changing the relationship between the handlebar-operation-related physical quantity and the steering-assisting-force-related physical quantity, for example, does not include "changing the relationship between the handlebar-operation-related physical quantity and the steering-assisting-force-related physical quantity, thereby causing the output of the steering-assisting-force-related physical quantity to be zero".

According to the embodiment of the present teaching, the way of "changing the relationship between the handlebar-operation-related physical quantity and the steering-assisting-force-related physical quantity such that the outputted steering-assisting-force-related physical quantity varies even when the handlebar-operation-related physical quantity is the same", for example, is "changing the relationship between the handlebar-operation-related physical quantity and the steering-assisting-force-related physical quantity such that the value (or magnitude) outputted as the steering-assisting-force-related physical quantity varies even when the value (or magnitude) inputted as the handlebar-operation-related physical quantity is the same". According to the embodiment of the present teaching, the outputted steering-assisting-force-related physical quantity varies depending on a change in the relationship between the handlebar-operation-related physical quantity (input) and the steering-assisting-force-related physical quantity (output), and accordingly, the outputted steering-assisting-force-related physical quantity includes a change caused by a change in the relationship. Cases in which the outputted steering-assisting-force-related physical quantity varies depending only on changes in any other factors (upper limits and lower limits of parameters, etc.) than this relationship do not include a change caused by a change in the relationship at all, and therefore, these cases are not pertinent to the present teaching. Cases in which the outputted steering-assisting-force-related physical quantity includes a change in this relationship as well as changes in other factors, are pertinent to the present teaching.

According to the embodiment of the present teaching, the way in which "the control device changes the relationship between the handlebar-operation-related physical quantity and the steering-assisting-force-related physical quantity by performing (2) such that the outputted steering-assisting-force-related physical quantity varies even when the handlebar-operation-related physical quantity is the same", for example, does not include limiting the steering-assisting-force-related physical quantity associated with the handlebar-operation-related physical quantity to a specified value when the handlebar-operation-related physical quantity is equal to or greater than a predetermined value. Thus, the way in which "the control device changes the relationship between the handlebar-operation-related physical quantity and the steering-assisting-force-related physical quantity by performing (2) such that the outputted steering-assisting-force-related physical quantity varies even when the handlebar-operation-related physical quantity is the same", for example, includes varying the outputted steering-assisting-force-related physical quantity even when the handlebar-operation-related physical quantity is the same in the output increasing range that exists both before and after a change in the relationship between the handlebar-operation-related physical quantity and the steering-assisting-force-related physical quantity.

According to the embodiment of the present teaching, when "changing the predetermined range of the handlebar-operation-related physical quantity in which the steering-assisting-force-related physical quantity is not outputted even with operation of the handlebar" and/or when "changing the relationship between the handlebar-operation-related physical quantity and the steering-assisting-force-related physical quantity", for example, the running condition of the straddled vehicle may be referred to. This makes it possible to set the steering assistance function appropriately for the running condition of the straddled vehicle. The running condition of the straddled vehicle may be, for example, the vehicle speed of the straddled vehicle, the acceleration or deceleration of the straddled vehicle, and when the drive source of the straddled vehicle is an engine, the running condition may be the number of engine revolutions or the degree of throttle opening.

In the straddled vehicle with a handlebar according to the embodiment of the present teaching, the control device may be configured to change the relationship between the handlebar-operation-related physical quantity and the steering-assisting-force-related physical quantity by performing (1) above such that the outputted steering-assisting-force-related physical quantity varies even when the handlebar-operation-related physical quantity is the same.

In the straddled vehicle with a handlebar according to the embodiment of the present teaching, the control device may be configured to change the relationship between the handlebar-operation-related physical quantity and the steering-assisting-force-related physical quantity at least when the handlebar-operation-related physical quantity inputted by operation of the handlebar is within a small-angle-operation-response range. The small-angle-operation-response range is one that is smaller than a value of the handlebar-operation-related physical quantity that is associated with half of the maximum possible output value of the steering-assisting-force-related physical quantity. The maximum possible output value is a predetermined value as the maximum value of the steering-assisting-force-related physical quantity that can be outputted in the relationship upon the operation of the handlebar being inputted.

In this straddled vehicle with a handlebar, the steering assistance function can be further improved for convenience. Details will be described below.

When the straddled vehicle with a handlebar is in motion, the operation angle of the handlebar is small. Specifically, the handlebar is operated within a range that is smaller than a value of the handlebar-operation-related physical quantity that is associated with half of the maximum possible output value of the steering-assisting-force-related physical quantity. Thus, in this straddled vehicle with a handlebar, the setting for the steering assistance function can be variable within the small-angle-operation-response range in which the handlebar is operated when the straddled vehicle is in motion. As a result, the convenience of the steering assistance function can be improved.

In the straddled vehicle with a handlebar according to the embodiment of the present teaching, the steering assisting force is one that is applied to the steerable wheel in a that is the same as or opposite to the direction of steering in consistency with the operation of the handlebar.

In the straddled vehicle with a handlebar according to the embodiment of the present teaching, when the control device performs (1) above, the control device may change the predetermined range of the handlebar-operation-related physical quantity in which the steering-assisting-force-related physical quantity is not outputted even with operation of the handlebar in such a manner so as to change the handlebar-operation-related physical quantity at which the steering-assisting-force-related physical quantity begins to be outputted in response to operation of the handlebar.

In this straddled vehicle with a handlebar, the handlebar-operation-related physical quantity at which the steering-assisting-force-related physical quantity begins to be outputted in response to operation of the handlebar is variable, which makes it easy for the rider to realize the effect of the change in the setting for the steering assistance function.

In the straddled vehicle with a handlebar according to the embodiment of the present teaching, when the control device performs (1) above, the control device may change the predetermined range of the handlebar-operation-related physical quantity in which the steering-assisting-force-related physical quantity is not outputted even with operation of the handlebar in such a manner so as to change the handlebar-operation-related physical quantity that causes an output of half of the maximum value of the steering-assisting-force-related physical quantity in response to operation of the handlebar.

In this straddled vehicle with a handlebar, the handlebar-operation-related physical quantity that causes an output of half of the maximum value of the steering-assisting-force-related physical quantity in response to operation of the handlebar can be variable, which makes it possible to change the setting for the steering assistance function in the entire angle range within which the handlebar is operated when the straddled vehicle is in motion.

In the straddled vehicle with a handlebar according to the embodiment of the present teaching, the control device may obtain a maximum voltage applicable to the actuator in response to an instruction inputted from outside of the straddled vehicle or vehicle-speed-related information that is related to the vehicle speed of the straddled vehicle; and in the actuator control processing, the control device may control the actuator by outputting an obtained limited applied voltage as a steering-assisting-force-related physical quantity, the obtained limited applied voltage being obtained by applying a limit to an applied voltage corresponding to a steering-assisting-force-related physical quantity, the obtained limited applied voltage does not exceed the maximum applicable voltage.

In this straddled vehicle with a handlebar, the voltage applied to the actuator is limited so as not to exceed the maximum voltage applicable to the actuator. Thereby, even when operation of the handlebar is the same, for example, there may be some cases in which the output of the actuator becomes smaller or in which the actuator is inactive. In this straddled vehicle with a handlebar, even when the rider conducts the same operation of the handlebar, the steering assisting force in response to the operation can be variable. Thus, the setting for the steering assistance function can be variable. As a result, the convenience of the steering assistance function can be improved.

The control device obtains the maximum voltage applicable to the actuator for use in the actuator control processing. The applied voltage may be, for example, indicated by duty cycle. The applied voltage can be changed, for example, by changing the duty cycle. The vehicle-speed-related information may be, for example, the vehicle speed itself, the shift position, or combination of the shift position and the number of engine revolutions.

The straddled vehicle with a handlebar according to the embodiment of the present teaching may be configured as follows:

the actuator is a rotating electrical machine;

in the actuator control processing, the control device controls the actuator based on the voltage applied to the actuator;

the voltage applied to the actuator is obtained based on both the applied voltage corresponding to the steering-assisting-force-related physical quantity and the maximum voltage applicable to the actuator, such that an output of the actuator does not exceed a maximum output of the actuator with reference to a Number of revolution-Torque (N-T) characteristic of the actuator;

the maximum output of the actuator corresponds to the maximum voltage applicable to the actuator; and the output of the actuator corresponds to the applied voltage corresponding to the steering-assisting-force-related physical quantity.

In this straddled vehicle with a handlebar, the output of the actuator does not exceed the maximum output of the actuator. Accordingly, for example, the behaviors of the actuator may vary even when operation of the handlebar is the same. In other words, even when the rider conducts the same operation of the handlebar, the steering assisting force in response to the operation can be variable. Thus, the setting for the steering assistance function can be variable. As a result, the convenience of the steering assistance function is improved.

Regarding the straddled vehicle with a handlebar according to the embodiment of the present teaching, when the vehicle speed of the straddled vehicle is high, the maximum voltage applicable to the actuator may be small, as compared to when the vehicle speed of the straddled vehicle is low.

In this straddled vehicle with a handlebar, the behaviors of the actuator can be more restrained when the vehicle speed is high than when the vehicle speed is low. Accordingly, for example, the handlebar operation angular speed can be decreased when the vehicle speed is high, and the handlebar operation angular speed can be increased when the vehicle speed is low.

A straddled vehicle with a handlebar according to another embodiment of the present teaching is configured as follows.

The straddled vehicle with a handlebar comprises:

a vehicle body that supports the handlebar such that the handlebar is rotatable;

a steerable wheel that is supported by the vehicle body and to which operation of the handlebar conducted by a rider of the straddled vehicle is transmitted mechanically, whereby the steerable wheel is steered according to the operation;

an actuator configured to apply a steering assisting force to the steerable wheel in accordance with operation of the handlebar conducted by the rider of the straddled vehicle; and a control device that carries out actuator control processing to control the actuator by outputting a steering-assisting-force-related physical quantity, which is a physical quantity related to the steering assisting force, in accordance with a handlebar-operation-related physical quantity, which is a physical quantity related to operation of the handlebar, wherein:

the control device obtains a maximum voltage applicable to the actuator in response to an instruction inputted from outside of the straddled vehicle or vehicle-speed-related information that is related to a vehicle speed of the straddled vehicle; and in the actuator control processing, the control device controls the actuator by outputting an obtained limited applied voltage as a steering-assisting-force-related physical quantity, the obtained limited applied voltage being obtained by applying a limit to an applied voltage corresponding to a steering-assisting-force-related physical quantity, the obtained limited applied voltage does not exceed the maximum applicable voltage.

In the straddled vehicle with a handlebar according to this other embodiment of the present teaching, the voltage applied to the actuator is limited so as not to exceed the maximum voltage applicable to the actuator. Thereby, for example, even when operation of the handlebar is the same, there may be some cases in which the output of the actuator becomes smaller or in which the actuator is inactive. In the above-described straddled vehicle with a handlebar, even when the rider conducts the same operation of the handlebar, the steering assisting force in response to the operation can be variable. Thus, the setting for the steering assistance function can be variable. As a result, the convenience of the steering assistance function can be improved.

The straddled vehicle with a handlebar according to this another embodiment of the present teaching is, for example, configured as follows:

the actuator is a rotating electrical machine;

in the actuator control processing, the control device controls the actuator based on the voltage applied to the actuator;

the voltage applied to the actuator is obtained based on both the applied voltage corresponding to the steering-assisting-force-related physical quantity and the maximum voltage applicable to the actuator, such that an output of the actuator does not exceed a maximum output of the actuator with reference to an N-T characteristic of the actuator;

the maximum output of the actuator corresponds to the maximum voltage applicable to the actuator; and the output of the actuator corresponds to the applied voltage corresponding to the steering-assisting-force-related physical quantity.

In this straddled vehicle with a handlebar, the output of the actuator does not exceed the maximum output of the actuator. Thereby, for example, even when operation of the handlebar is the same, the behaviors of the actuator may vary. In other words, even when the rider conducts the same operation of the handlebar, the steering assisting force in response to the operation can be variable. Thus, the setting for the steering assistance function can be variable. As a result, the convenience of the steering assistance function can be improved.

The straddled vehicle with a handlebar according to this another embodiment of the present teaching is, for example, configured such that, when the vehicle speed of the straddled vehicle is high, the maximum voltage applicable to the actuator is low, as compared to when the vehicle speed of the straddled vehicle is small.

In this straddled vehicle with a handlebar, the behaviors of the actuator can be more restrained when the vehicle speed is high than when the vehicle speed is low. Accordingly, for example, the handlebar operation angular speed can be decreased when the vehicle speed is high, and the handlebar operation angular speed can be increased when the vehicle speed is low.

An electric steering device according to an embodiment of the present teaching is configured to be used in a straddled vehicle with a handlebar. The straddled vehicle with a handlebar comprises a vehicle body and a steerable wheel. The vehicle body has the handlebar. The vehicle body supports the handlebar such that the handlebar is rotatable and that a maximum operation angle of the handlebar from a handle neutral position, which is a handle position when the straddled vehicle is moving straight ahead, is less than 180 degrees. The steerable wheel is supported by the vehicle body. Operation of the handlebar conducted by the rider of the straddled vehicle is transmitted to the steerable wheel mechanically, whereby the steerable wheel is steered according to the operation. The electric steering device comprises an actuator and a control device. The actuator is configured to apply a steering assisting force to the steerable wheel in accordance with operation of the handlebar conducted by the rider of the straddled vehicle. The control device controls the actuator by outputting a steering-assisting-force-related physical quantity, which is a physical quantity related to steering assisting force, in accordance with a handlebar-operation-related physical quantity, which is a physical quantity related to operation of the handlebar. The control device is configured to change a relationship between the handlebar-operation-related physical quantity and the steering-assisting-force-related physical quantity by performing at least one of (1) or (2) below, in response to an instruction inputted from outside of the straddled vehicle or fulfillment of a condition that restrains behaviors of the actuator, such that the outputted steering-assisting-force-related physical quantity varies even when the handlebar-operation-related physical quantity is the same;

(1) changing a predetermined range of the handlebar-operation-related physical quantity in which the steering-assisting-force-related physical quantity is not outputted even with operation of the handlebar, thereby varying the outputted steering-assisting-force-related physical quantity even when the handlebar-operation-related physical quantity is the same; and (2) changing the relationship between the handlebar-operation-related physical quantity and the steering-assisting-force-related physical quantity outputted in accordance with the handlebar-operation-related physical quantity in an output increasing range in which as the handlebar-operation-related physical quantity is increasing, the steering-assisting-force-related physical quantity outputted in accordance with the handlebar-operation-related physical quantity increases, thereby varying the outputted steering-assisting-force-related physical quantity even when the handlebar-operation-related physical quantity is the same.

In the straddled vehicle with a handlebar that includes this electric steering device, the convenience of the steering assistance function can be improved. Details will be described below.

Regarding a straddled vehicle with a handlebar, the operation angle of the handlebar when the straddled vehicle is in motion is small. Accordingly, sensitivity of driving conditions is easily influenced by the steering of the rider. Regarding a straddled vehicle with a handlebar that includes the above-described electric steering device, even when the rider conducts the same operation of the handlebar, the steering assisting force in response to the operation can be variable. In other words, the setting for the steering assistance function can be variable. As a result, the convenience of the steering assistance function can be improved.

An electric steering device according to another embodiment of the present teaching is, for example, configured as follows:

the electric steering device is configured to be used in a straddled vehicle with a handlebar, the straddled vehicle with a handlebar comprising:

a vehicle body that supports the handlebar such that the handlebar is rotatable; and a steerable wheel that is supported by the vehicle body and to which operation of the handlebar conducted by a rider of the straddled vehicle is transmitted mechanically, whereby the steerable wheel is steered according to the operation;

the electric steering device comprising:

an actuator configured to apply a steering assisting force to the steerable wheel in accordance with operation of the handlebar conducted by the rider of the straddled vehicle; and a control device that carries out actuator control processing to control the actuator by outputting a steering-assisting-force-related physical quantity, which is a physical quantity related to steering assisting force, in accordance with a handlebar-operation-related physical quantity, which is a physical quantity related to operation of the handlebar, wherein:

the control device obtains a maximum voltage applicable to the actuator in response to an instruction inputted from outside of the straddled vehicle or vehicle-speed-related information that is related to the vehicle speed of the straddled vehicle; and in the actuator control processing, the control device controls the actuator by outputting an obtained limited applied voltage as a steering-assisting-force-related physical quantity, the obtained limited applied voltage being obtained by applying a limit to an applied voltage corresponding to a steering-assisting-force-related physical quantity, the obtained limited applied voltage does not exceed the maximum applicable voltage.

In the straddled vehicle with a handlebar that includes this electric steering device, the convenience of the steering assistance function can be improved. Details will be described below.

With the electric steering device, the voltage applied to the actuator is limited not to exceed the maximum applicable voltage. Accordingly, for example, even when operation of the handlebar is the same, there may be some cases in which the output of the actuator becomes smaller or in which the actuator is inactive. In the straddled vehicle with a handlebar that includes this electric steering device, even when the rider conducts the same operation of the handlebar, the steering assisting force in response to the operation can be variable. In other words, the setting for the steering assistance function can be variable. As a result, the convenience of the steering assistance function can be improved.

Some embodiments of the present teaching will hereinafter be described in detail with reference to the drawings, and the detailed description of the embodiments will provide a clearer picture of the above-mentioned objective and other objectives, the features, the aspects and the advantages of the present teaching. The term "and/or" used herein includes one of the associated items in a list and all possible combinations of the associated items. The terms "including", "comprising", or "having", and variations thereof used herein specify the presence of stated features, steps, operations, elements, components, and/or equivalents thereof, and can include one or more of the steps, operations, elements, components, and/or their groups. Unless otherwise defined, all terms (including technical terms and scientific terms) used herein have the same meanings as commonly understood by one of ordinary skill in the art to which the present teaching pertains. It should be understood that terms, such as those defined in commonly used dictionaries, should be interpreted as having meanings that are consistency with their meanings in the context of the present disclosure and relevant art and should not be interpreted in an idealized or overly formal sense unless expressly so defined herein. It should be understood that the description of the present teaching discloses a number of techniques and steps. Each of these has an individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Effect of Invention

The present teaching can improve the convenience of steering assistance function.

BRIEF DESCRIPTION OF DRAWINGS

FIG. 4A, FIG. 4B and FIG. 4C are block diagrams conceptually showing an example of an electric steering device according to another embodiment of the present teaching.

DESCRIPTION OF EMBODIMENTS

With reference to the drawings, a straddled vehicle with a handlebar according to an embodiment of the present teaching will be described in detail. The embodiment described below is only an example. The present teaching shall not be considered limited to the embodiment below.

Figure 1:
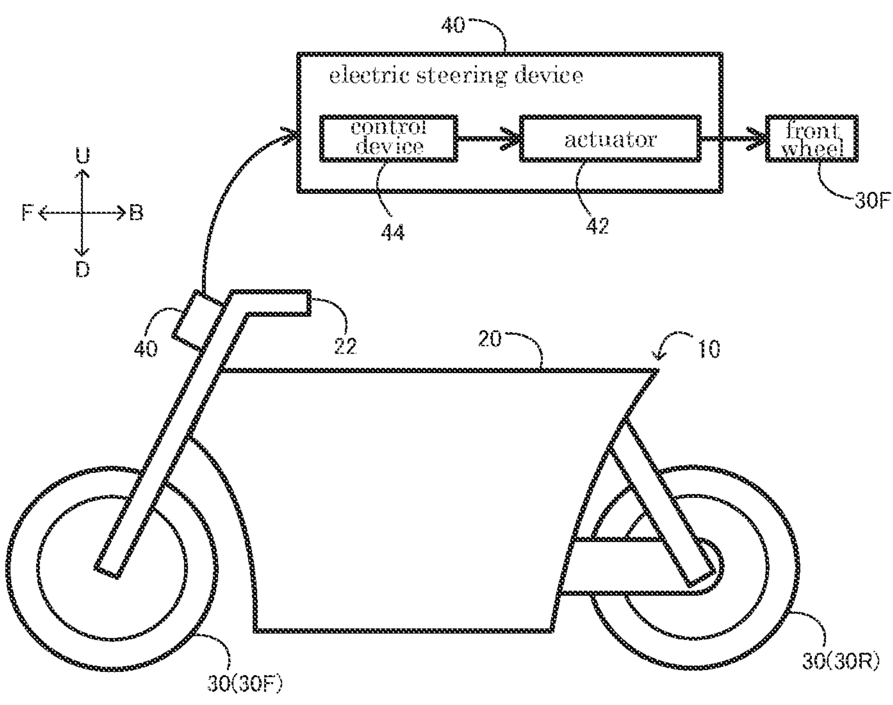
FIG. 1 is a diagram showing the framework of a straddled vehicle with a handlebar according to an embodiment of the present teaching.

With reference to FIG. 1, a straddled vehicle 10 with a handlebar (which will hereinafter be referred to simply as straddled vehicle 10) according to an embodiment of the present teaching will be described. The straddled vehicle 10 includes a vehicle body 20, a plurality of wheels 30, and an electric steering device 40.

The vehicle body 20 has a handlebar 22. The vehicle body 20 supports the handlebar 22 such that the handlebar 22 is rotatable and that the maximum operation angle of the handlebar 22 from a handle neutral position, which is a handle position when the straddled vehicle 10 is moving straight ahead, is less than 180 degrees. When the straddled vehicle 10 turns left L, the vehicle body 20 leans leftward L, and when the straddled vehicle 10 turns right R, the vehicle body 20 leans rightward R. Directions of the straddled vehicle 10 are based on the rider sitting on the seat of the straddled vehicle 10.

The vehicle body 20 supports the plurality of wheels 30. When the straddled vehicle 10 turns left L, the plurality of wheels 30 leans leftward L together with the vehicle body 20, and when the straddled vehicle 10 turns right R, the plurality of wheels 30 leans rightward R together with the vehicle body 20. The plurality of wheels 30 includes a front wheel 30F serving as a steerable wheel, and a rear wheel 30R serving as a drive wheel. Accordingly, the front wheel 30F serving as a steerable wheel is supported by the vehicle body 20. Operation of the handlebar 22 conducted by the rider of the straddled vehicle 10 is transmitted to the front wheel 30F mechanically, and thereby, the front wheel 30F serving as a steerable wheel is steered in accordance with the operation. The rear wheel 30R serving as a drive wheel is rotated by power transmitted from a power unit (not shown) supported by the vehicle body 20, and thereby, the straddled vehicle 10 runs.

The electric steering device 40 includes an actuator 42 and a control device 44. The actuator 42 is configured to apply a steering assisting force to the front wheel 30F in accordance with operation of the handlebar 22 conducted by the rider. The control device 44 controls the actuator 42 by outputting a steering-assisting-force-related physical quantity (i.e., "first physical quantity") depending on a handlebar-operation-related physical quantity (i.e., "second physical quantity"). The handlebar-operation-related physical quantity is a physical quantity related to operation of the handlebar 22. The steering-assisting-force-related physical quantity is a physical quantity related to the steering assisting force. The steering assisting force is a force that is applied to the front wheel 30F in the a direction that is the same as or opposite to the direction of steering in consistency with operation of the handlebar 22. FIG. 1 shows that the actuator 42 and the control device 44 are both located near the handlebar 22; however, for example, the control device 44 may be located away from the handlebar 22.

The control device 44 is configured to change the relationship between the handlebar-operation-related physical quantity and the steering-assisting-force-related physical quantity by performing at least one of (1) or (2) below, in response to an instruction inputted from outside of the straddled vehicle 10 or fulfillment of a condition that restrains behaviors of the actuator 42, such that the value (or magnitude) of the outputted steering-assisting-force-related physical quantity varies even when the value (or magnitude) of the handlebar-operation-related physical quantity is the same:

(1) changing a predetermined range of the handlebar-operation-related physical quantity in which the steering-assisting-force-related physical quantity is not outputted even with operation of the handlebar 22, thereby varying the outputted steering-assisting-force-related physical quantity even when the handlebar-operation-related physical quantity is the same; and (2) changing the relationship between the handlebar-operation-related physical quantity and the steering-assisting-force-related physical quantity outputted in accordance with the handlebar-operation-related physical quantity in an output increasing range in which as the handlebar-operation-related physical quantity is increasing, the steering-assisting-force-related physical quantity outputted in accordance with the handlebar-operation-related physical quantity increases, thereby varying the outputted steering-assisting-force-related physical quantity even when the handlebar-operation-related physical quantity is the same.

The control device 44 may be configured to change the relationship between the handlebar-operation-related physical quantity and the steering-assisting-force-related physical quantity by performing (1) above such that the value (or magnitude) of the outputted steering-assisting-force-related physical quantity varies even when the value (or magnitude) of the handlebar-operation-related physical quantity is the same. In performing (1) above, the control device 44 may change the predetermined range of the handlebar-operation-related physical quantity in which the steering-assisting-force-related physical quantity is not outputted even with operation of the handlebar in such a manner so as to change the value (or magnitude) of the handlebar-operation-related physical quantity at which the steering-assisting-force-related physical quantity begins to be outputted with operation of the handlebar 22. In performing (1) above, the control device 44 may change the predetermined range of the handlebar-operation-related physical quantity in which the steering-assisting-force-related physical quantity is not outputted even with operation of the handlebar 22 in such a manner so as to change the value (or magnitude) of the handlebar-operation-related physical quantity that causes an output of half of the maximum value of the steering-assisting-force-related physical quantity with operation of the handlebar 22.

The control device 44 may be configured to change the relationship between the handlebar-operation-related physical quantity and the steering-assisting-force-related physical quantity at least when the handlebar-operation-related physical quantity inputted by operation of the handlebar is within a small-angle-operation-response range. The small-angle-operation-response range is, for example, a range that is smaller than a value of the handlebar-operation-related physical quantity corresponding to half of the maximum possible output value of the steering-assisting-force-related physical quantity. The maximum possible output value is a predetermined value as the maximum value of the steering-assisting-force-related physical quantity that can be outputted in the relationship upon the operation of the handlebar being inputted.

The steering assistance function of the straddled vehicle 10 is improved for convenience. Details will be described below.

When the straddled vehicle 10 is in motion, the operation angle of the handlebar 22 is small. Accordingly, sensitivity of driving conditions is easily influenced by the steering of the rider. Regarding the straddled vehicle 10, even when the rider conducts the same operation of the handlebar 22, the steering assisting force in response to the operation can be variable. In other words, the setting for the steering assistance function can be variable. As a result, the convenience of the steering assistance function can be improved.

[Embodiments of Electric Steering Device]

Next, with reference to FIGS. 2 and 3, an embodiment of the electric steering device 40 will be described. FIGS. 2 and 3 merely show an example of the electric steering device 40. The electric steering device 40 is not limited to the one shown by FIGS. 2 and 3.

Figure 2A:
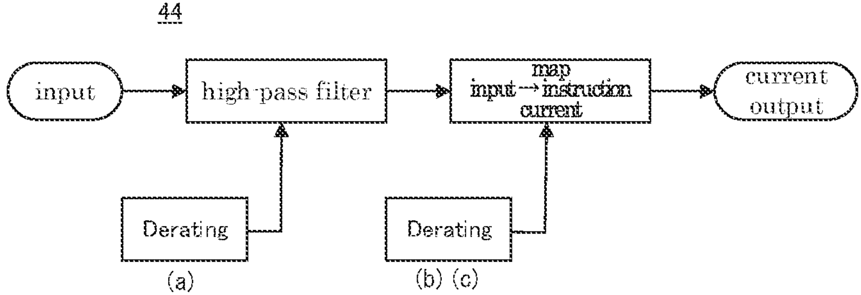
FIG. 2A and FIG. 2B are block diagrams conceptually showing an example of an electric steering device included in the straddled vehicle with a handlebar according to the embodiment of the present teaching.
Figure 2B:
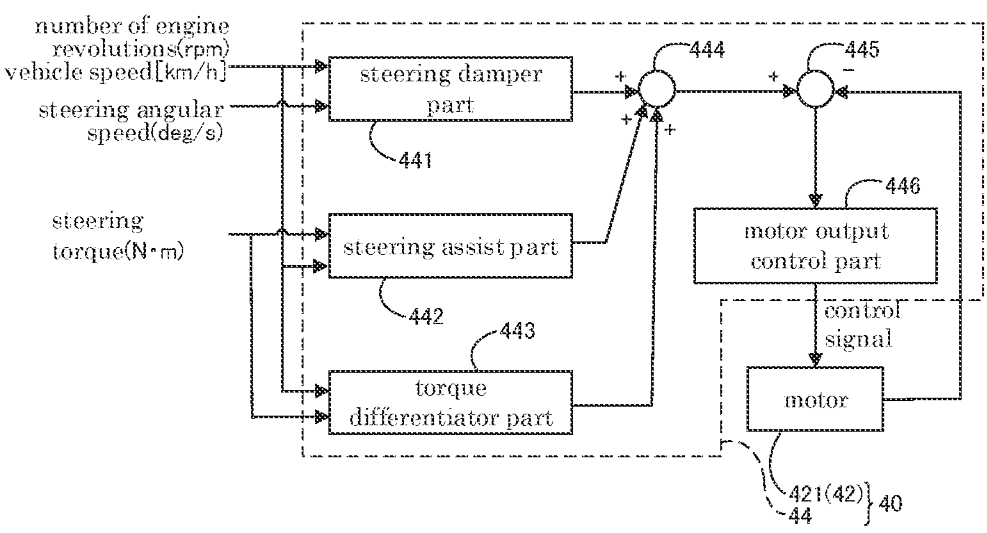

With reference to FIG. 2A and FIG. 2B, the function of the control device 44 will be described. As shown by FIG. 2A, the control device 44 produces an electric current to be outputted to the actuator 42, depending on operation of the handlebar 22 conducted by the rider, i.e., an input. The control device 44 outputs the steering-assisting-force-related physical quantity in accordance with the handlebar-operation-related physical quantity and thereby conducts actuator control processing to control the actuator 42.

What is inputted is the handlebar-operation-related physical quantity related to operation of the handlebar 22 conducted by the rider. The handlebar-operation-related physical quantity is detected, for example, by a suitable sensor. The handlebar-operation-related physical quantity detected by the sensor is inputted into the control device 44. The input may be, for example, the speed of rotation of the handlebar 22 around the steering axis (which will be referred to as steering angular speed) or the torque generated from operation of the handlebar 22 conducted by the rider (which will be referred to as steering torque). The produced electric current corresponds to the steering-assisting-force-related physical quantity.

For production of the electric current to be outputted to the actuator 42, a high-pass filter and a map are used. FIG. 2A shows that a high-pass filter is necessarily used; however, depending on the kind of input, it may be unnecessary to use a high-pass filter. The frequency to which the high-pass filter is applied, i.e., the frequency targeted for cutoff by the high-pass filter is, for example, the frequency of steering torque. When the high-pass filter is applied to the steering torque, a differential value of steering torque can be obtained. The differential value of steering torque is the one obtained by differentiating the steering torque with respect to time, and this differential value shows a change in the steering torque. A table or a mathematical formula may be used instead of a map.

When a specified condition is satisfied, the control device 44 changes at least one of the cut-off frequency of the high-pass filter, the dead band, or the gain such that the electric current outputted to the actuator 42 varies even when the input is the same. The dead band is a predetermined band of input (a predetermined range of input values) in which no output is produced even with input. The gain is the rate of output to input.

Figure 3A:
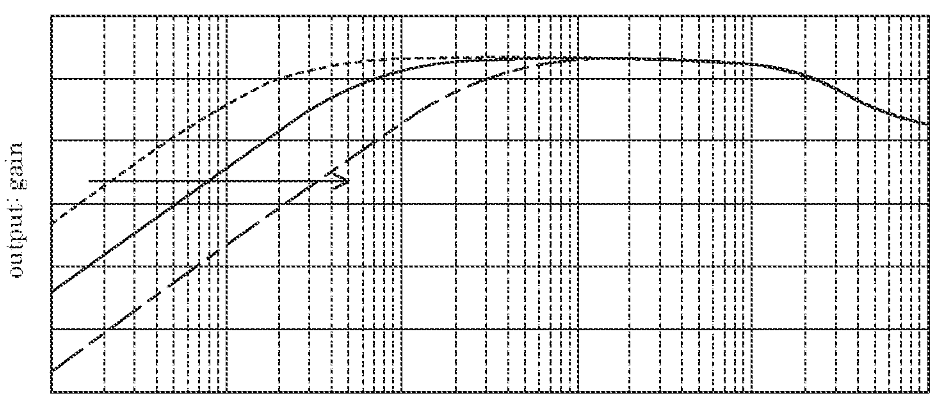
FIG. 3A, FIG. 3B and FIG. 3C are illustration diagrams illustrating control that is carried out by a control device of the electric steering device shown by FIG. 2 to change the relationship between a handlebar-operation-related physical quantity and a steering-assisting-force-related physical quantity such that the value (or magnitude) of the outputted steering-assisting-force-related physical quantity varies even when the value (or magnitude) of the handlebar-operation-related physical quantity is the same.

With a change in the cut-off frequency of the high-pass filter, the frequency of usage of the actuator 42 changes. In other words, the number of times an electric current is outputted to the actuator 42 changes. Thus, it is possible to change the setting by changing the cut-off frequency of the high-pass filter. When the cut-off frequency becomes higher, the assistance to the rider's input becomes smaller, and when the cut-off frequency becomes lower, the assistance to the rider's input becomes greater. FIG. 3A shows an exemplary way of changing the cut-off frequency of the high-pass filter.

Figure 3B:
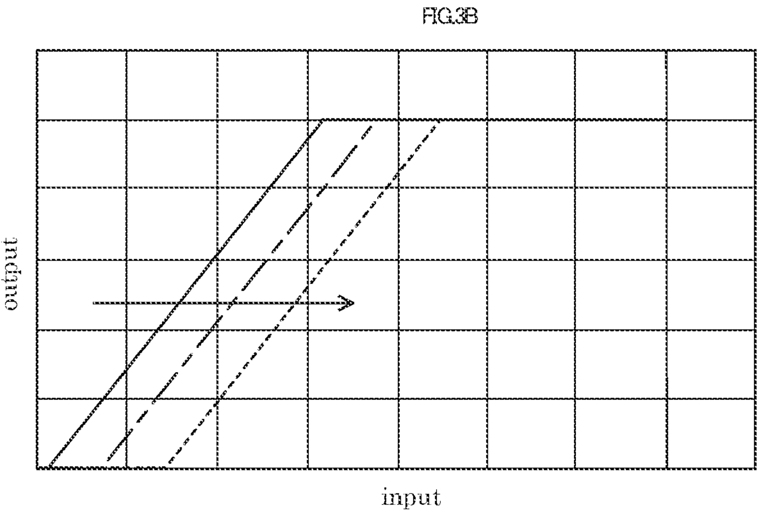

With a change in the dead band, the frequency of usage of the actuator 42 changes. In other words, the number of times an electric current is outputted to the actuator 42 changes. Additionally, even when the input is the same, the electric current outputted to the actuator 42 can be changed. Thus, it is possible to change the setting by changing the dead band. FIG. 3B shows an exemplary way of changing the dead band.

Figure 3C:
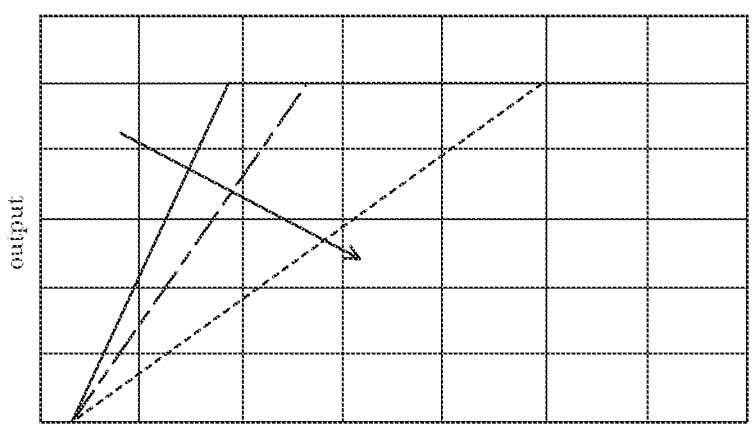

With a change in the gain, the electric current outputted to the actuator 42 can be changed even when the input is the same. Thus, it is possible to change the setting by changing the gain. FIG. 3C shows an exemplary way of changing the gain.

With reference to FIG. 2A and FIG. 2B, the function of the control device 44 will be furthermore described. In FIG. 2B, a motor 421 is shown as an example of the actuator 42. As shown by FIG. 2B, the control device 44 includes a steering damper part 441, a steering assist part 442, a torque differentiator part 443, a current instruction value generator part 444, a current deviation generator part 445, and a motor output control part 446.

The steering damper part 441 generates a current instruction value that makes it difficult for the rider to operate the handlebar 22, depending on the inputted steering angular speed. Thus, the steering damper part 441 generates a current instruction value for a damping component, depending on the inputted steering angular speed. For generation of the current instruction value for the damping component, for example, the inputted steering angular speed and a map are used. When a specified condition is fulfilled, the dead band or the gain is changed. Thereby, the setting for damping is changed. As a result, in the electric current outputted to the motor 421, a current in accordance with the current instruction value for the damping component is changed.

The steering assist part 442 generates a current instruction value that assists the rider to operate (i.e., steer) the handlebar 22, depending on the inputted steering torque. Thus, the steering assist part 442 generates a current instruction value for an assisting component, depending on the inputted steering torque. For generation of the current instruction value for the assisting component, for example, the inputted steering torque and a map are used. When a specified condition is fulfilled, the dead band or the gain is changed. Thereby, the setting for assistance is changed. As a result, in the electric current outputted to the motor 421, a current in accordance with the current instruction value for the assisting component is changed.

When the inputted steering torque changes, the torque differentiator part 443 generates a current instruction value that assists the rider to operate (i.e., steer) the handlebar 22. Thus, the torque differentiator part 443 generates a current instruction value for a torque differentiating component, depending on the differential value of the steering torque. For generation of the current instruction value for the torque differentiating component, for example, the inputted steering torque, a high-pass filter, and a map are used. Specifically, the high-pass filter is applied to the inputted steering torque to generate a differential value of the steering torque, and the generated differential value of the steering torque and a map are used. When a specified condition is fulfilled, the cut-off frequency of the high-pass filter is changed, and the dead band or the gain is changed. Thereby, the setting for torque differentiation is changed. As a result, in the electric current outputted to the motor 421, a current in accordance with the current instruction value for the torque differentiating component is changed.

In the meantime, the number of engine revolutions and the vehicle speed are inputted to each of the steering damper part 441, the steering assist part 442, and the torque differentiator part 443. The number of engine revolutions and the vehicle speed are used to change the settings for steering damping, steering assistance, and torque differentiation. To each of the steering damper part 441, the steering assist part 442, and the torque differentiator part 443, the acceleration or deceleration in addition to the number of engine revolutions and the vehicle speed may be inputted. The acceleration or deceleration is also used to change the settings for steering damping, steering assistance, and torque differentiation. For example, when the straddled vehicle is accelerating, the assistance to the rider's input may be reduced, and when the straddled vehicle is decelerating, the assistance to the rider's input may be increased.

The current instruction value generator part 444 generates a current instruction value based on the current instruction values generated respectively by the steering damper part 441, the steering assist part 442, and the torque differentiator part 443. This generated current instruction value corresponds to a current generated by combining the current corresponding to the current instruction value for the damping component, the current corresponding to the current instruction value for the assisting component, and the current corresponding to the current instruction value for the torque differentiating component.

The current deviation generator part 445 generates a current deviation based on the current instruction value generated by the current instruction value generator part 444 and an observed current value. The observed current value is obtained by observing the current actually flowing in the motor 421.

The motor output control part 446 generates a drive signal for the motor 421 based on the current deviation generated by the current deviation generator part 445. The motor 421 is driven by the drive signal generated by the motor output control part 446.

In the straddled vehicle 10 including this electric steering device 40, the steering assistance function can be improved for convenience. Details will be described below.

When the straddled vehicle 10 is in motion, the operation angle of the handlebar 22 is small. Accordingly, sensitivity of driving conditions is easily influenced by the steering of the rider. Regarding the straddled vehicle 10 including the electric steering device 40, even when the rider conducts the same operation of the handlebar 22, the steering assisting force in response to the operation can be variable. In other words, the setting for the steering assistance function can be variable. As a result, the convenience of the steering assistance function can be improved.

With reference to FIG. 4A and FIG. 4B, another embodiment of the electric steering device will be described. As compared to the electric steering device 40, an electric steering device 40A according to this another embodiment includes a control device 44A instead of the control device 44, as shown in FIG. 4A. As compared to the control device 44, the control device 44A includes a motor output control part 446A instead of the motor output control part 446.

With reference to FIG. 4B, a description will be given. The motor output control part 446A obtains a voltage applied to the motor 421, based on a current instruction value for the motor 421. The motor output control part 446A calculates a duty cycle based on the voltage applied to the motor 421. The duty cycle may be used with no change or with change. Specifically, the motor output control part 446A sets an upper limit on the duty cycle, depending on the vehicle speed. When the duty cycle obtained by calculation is over the upper limit of the duty cycle, a change is made such that the duty cycle does not exceed the upper limit of the duty cycle. The duty cycle after the change may be one that does not drive the motor 421. Voltage pulses are generated based on the thus changed duty cycle or the unchanged duty cycle (the duty cycle itself obtained by calculation). When the voltage pulses are supplied to the motor 421, the motor 421 is driven. Thus, in the actuator control processing, the control device 44A controls the motor 421 based on the voltage applied to the motor 421.

With reference to FIG. 4C, the voltage applied to the motor 421 will be described.

With reference to the N-T characteristics of the motor 421 (see FIG. 4C), the voltage applied to the motor 421 is obtained based on both an applied voltage corresponding to the current instruction value and a maximum voltage applicable to the motor 421, such that the motor output will not exceed a maximum motor output. The maximum motor output corresponds to the maximum voltage applicable to the motor 421. The motor output depends on the voltage applied to the motor 421 corresponding to the current instruction value.

In FIG. 4C, both the solid oblique line and the dashed oblique line show a maximum voltage applicable to the motor 421 (upper limit of the duty cycle). When the maximum voltage applicable to the motor 421 is changed, the line showing the maximum voltage applicable to the motor 421 (such as the solid oblique line or the dashed oblique line) moves in directions shown by the arrow (in the figure, moves right upward or left downward). In the case shown by the dashed line, the voltage applied to the motor 421 is more limited than in the case shown by the solid line. Suppose, for example, the voltage to be applied to the motor 421 is between the solid oblique line and the dashed oblique line. In this case, if the maximum applicable voltage is set as shown by the solid line, it is not necessary to change the voltage applied to the motor 421, but if the maximum applicable voltage is set as shown by the dashed line, the voltage applied to the motor 421 is changed. The voltage applied to the motor 421 is changed, for example, to one that is equal to or lower than the maximum applicable voltage shown by the dashed line. The voltage applied to the motor 421 may be changed, for example, to one that does not drive the motor 421.

In the straddled vehicle including this electric steering device 40A, the steering assistance function can be improved for convenience. Details will be described below.

With the electric steering device 40A, the voltage applied to the motor 421 is limited not to exceed a maximum applicable voltage. Thereby, for example, even when operation of the handlebar 22 is the same, there may be some cases in which the output of the motor 421 becomes smaller and in which the motor 421 is inactive. Regarding a straddled vehicle with the handlebar 22 that includes the electric steering device 40A, even when the rider conducts the same operation of the handlebar 22, the steering assisting force in response to the operation can be variable. In other words, the setting for the steering assistance function can be variable. As a result, the convenience of the steering assistance function can be improved.

Other Embodiments

The embodiments and modifications described above and/or illustrated by the drawings are to make the present disclosure easier to understand and not to limit the concept of the present disclosure. It is possible to adapt or alter the embodiments and modifications described above without departing from the gist thereof. The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments and modifications described in the present specification or during the prosecution of the present application. Such embodiments and modifications are to be understood as non-exclusive. For example, the terms “preferable” and “good” in the present specification are to be understood as non-exclusive, and these terms mean “preferable but not limited to this” and “good but not limited to this”, respectively.

For example, the way in which the electric steering device 40A obtains a current instruction value may be different from the way in which the electric steering device 40 obtains a current instruction value.

For example, the control device may control the actuator such that the output of the actuator becomes zero, i.e., the actuator stops its output. In this case, the actuator can be used as an inertial damper.

The straddled vehicle includes, for example, scooters, mopeds, snowmobiles, watercrafts, ATVs (all-terrain vehicles), etc.

LIST OF REFERENCE SIGNS

10: straddled vehicle with a handlebar

20: vehicle body

22: handlebar

30: wheel

30F: front wheel (steerable wheel)

30R: rear wheel

40: electric steering device

42: actuator

44: control device

The invention claimed is:

1. A straddled vehicle, comprising:

a vehicle body having a handlebar that is rotatable, a maximum operation angle of the handlebar from a handle neutral position being less than 180 degrees, the handle neutral position being a position of the handlebar in which the straddled vehicle is moving straight ahead;

a steerable wheel that is supported by the vehicle body, operation of the handlebar by a rider of the straddled vehicle being transmitted mechanically to the steerable wheel, to thereby steer the steerable wheel;

an actuator configured to apply a steering assisting force to the steerable wheel in accordance with the operation of the handlebar by the rider of the straddled vehicle; and a control device configured to carry out actuator control processing, to thereby control the actuator, by outputting a first physical quantity, which is a physical quantity related to the steering assisting force, in accordance with a second physical quantity, which is a physical quantity related to the operation of the handlebar, the control device being configured to change a relationship between the second physical quantity and the first physical quantity, during which referring to a running condition of the straddled vehicle is not necessary, by performing (1) or (2), or both, below, in response to an instruction received from an outside of the straddled vehicle or fulfillment of a condition that restrains behaviors of the actuator:

(1) setting or changing a dead band, which is a predetermined range of the second physical quantity in which the first physical quantity is not outputted even with the operation of the handlebar; and (2) setting or changing an output increasing range in which, as the second physical quantity increases, the first physical quantity outputted in accordance with the second physical quantity increases.

2. The straddled vehicle according to claim 1, wherein:

the control device is configured to change the relationship between the second physical quantity and the first physical quantity at least when the second physical quantity inputted by the operation of the handlebar is within a small-angle-operation-response range, wherein the small-angle-operation-response range is a range of the second physical quantity in which a value thereof is smaller than a value of the second physical quantity that corresponds to half of a maximum possible output value of the first physical quantity, the maximum possible output value being a predetermined maximum value of the first physical quantity that can be outputted upon the operation of the handlebar being inputted.

3. The straddled vehicle according to claim 1, wherein the steering assisting force is a force that is applied to the steerable wheel in a direction that is the same as or opposite to a direction of steering in consistency with the operation of the handlebar.

4. The straddled vehicle according to claim 1, wherein the control device performs (1) to change the second physical quantity at which the first physical quantity begins to be outputted in response to the operation of the handlebar.

5. The straddled vehicle according to claim 4, wherein the control device performs (1) to change the second physical quantity, to thereby cause an output that is half of a maximum value of the first physical quantity in response to the operation of the handlebar.

6. The straddled vehicle according to claim 1, wherein:

the control device obtains a maximum voltage applicable to the actuator in response to the instruction received from the outside of the straddled vehicle or vehicle-speed-related information that is related to a vehicle speed of the straddled vehicle;

in the actuator control processing, the control device controls the actuator by applying a limit to a voltage applied to the actuator, to thereby output, as the first physical quantity, a limited applied voltage that does not exceed the maximum voltage.

7. The straddled vehicle according to claim 6, wherein:

the actuator is a rotating electrical machine;

the voltage applied to the actuator is so limited that an output of the actuator does not exceed a maximum output of the actuator with reference to a Number of revolution-Torque (N-T) characteristic of the actuator;

the maximum output of the actuator corresponds to the maximum voltage applicable to the actuator; and the output of the actuator corresponds to the voltage applied to the actuator.

8. The straddled vehicle according to claim 6, wherein:

when the vehicle speed of the straddled vehicle increases, the maximum voltage applicable to the actuator decreases.

9. The straddled vehicle according to claim 1, wherein the instruction received from the outside of the straddled vehicle includes an instruction inputted by the rider for operating a terminal device communicating with the straddled vehicle.

10. The straddled vehicle according to claim 1, wherein the condition that restrains the behaviors of the actuator is a condition that relates to a state of the actuator itself, or to a state of an electric power source in the case where the actuator is actuated by electric power supplied from the electric power source provided in the straddled vehicle.

11. The straddled vehicle according to claim 10, wherein the condition that relates to the state of the actuator itself is whether or not a temperature of a part of the actuator that is heated when the actuator is active is higher than a reference temperature.

12. The straddled vehicle according to claim 10, wherein the condition that relates to the state of the electric power source is whether or not a voltage applied to the control device is lower than a reference voltage.

13. An electric steering device configured to be used in a straddled vehicle that includes a vehicle body having a handlebar that is rotatable, a maximum operation angle of the handlebar from a handle neutral position being less than 180 degrees, the handle neutral position being a position of the handlebar in which the straddled vehicle is moving straight ahead;

a steerable wheel that is supported by the vehicle body, operation of the handlebar by a rider of the straddled vehicle being transmitted mechanically to the steerable wheel, to thereby steer the steerable wheel;

the electric steering device comprising:

an actuator configured to apply a steering assisting force to the steerable wheel in accordance with the operation of the handlebar by the rider of the straddled vehicle; and a control device that controls the actuator by outputting a first physical quantity, which is a physical quantity related to the steering assisting force, in accordance with a second physical quantity, which is a physical quantity related to the operation of the handlebar, the control device being configured to change a relationship between the second physical quantity and the first physical quantity, during which referring to a running condition of the straddled vehicle is not necessary, by performing (1) or (2), or both, below, in response to an instruction received from an outside of the straddled vehicle or fulfillment of a condition that restrains behaviors of the actuator:

(1) setting or changing a dead band, which is a predetermined range of the second physical quantity in which the first physical quantity is not outputted even with the operation of the handlebar; and (2) setting or changing an output increasing range in which as the second physical quantity increases, the first physical quantity outputted in accordance with the second physical quantity increases.

* * * * *